June 28, 1932.  K. GRUBER  1,865,314
CHUCK FOR HOLDING A MANDREL STEM
Filed Aug. 9, 1930

INVENTOR
KARL GRUBER
BY HIS ATTORNEYS
Howson and Howson

Patented June 28, 1932

1,865,314

UNITED STATES PATENT OFFICE

KARL GRUBER, OF GLADBACH-RHEYDT, GERMANY

CHUCK FOR HOLDING A MANDREL STEM

Application filed August 9, 1930, Serial No. 474,209, and in Germany November 1, 1929.

This invention relates to chucks for holding mandrel stems, particularly chucks for holding the stems of mandrels used in tube expanding machinery.

One object of the invention is the provision of a chuck of the class described which will permit ready release of the mandrel stem upon completion of rolling or even during rolling. A further object is the provision of such a chuck, together with actuating mechanism which will operate mechanically to cause the chuck to engage and disengage the mandrel stem. Other objects will become apparent upon consideration of the following specification.

One form of the invention is shown by way of illustration in the accompanying drawings, wherein—

Figure 1:
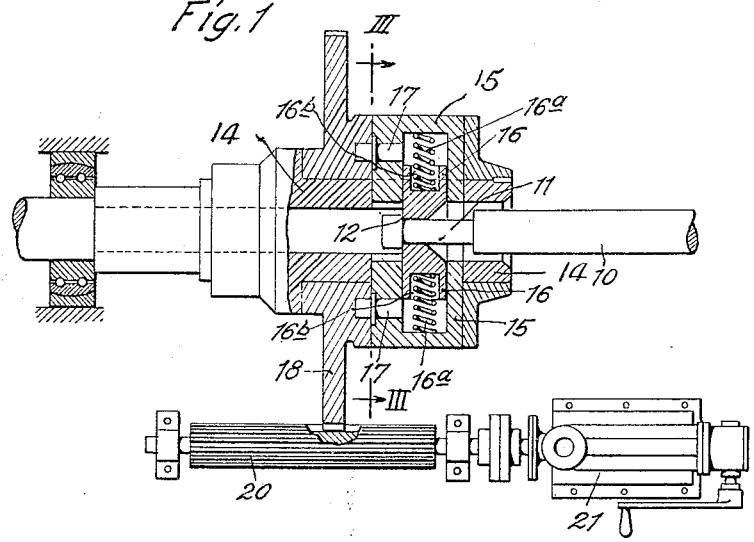
Figure 2:
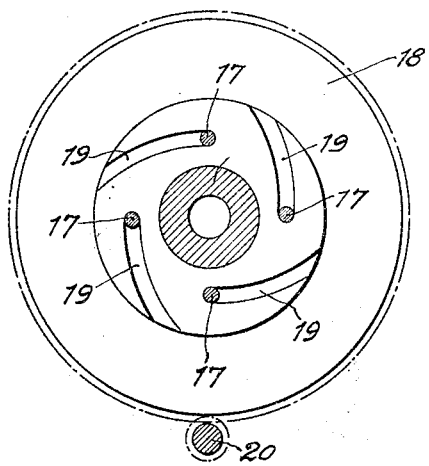
Figure 3:
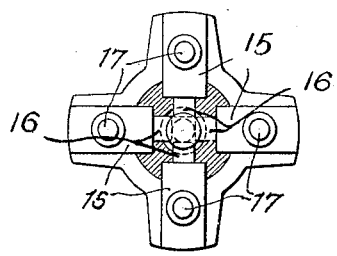

Figure 1 is an elevation of the apparatus, partly shown in longitudinal section, Fig. 2 is a section between the head and the disc taken on the line II—II of Figure 1, and Fig. 3 is a section through the head on the line III—III of Figure 1.

According to the invention there is provided a chuck comprising a head, a plurality of jaws in the head for engaging the mandrel stem, and jaw actuating means on the head for moving the jaws into and out of engagement with the mandrel. Mechanical means is also provided for operating the jaws actuating means.

Referring now to the drawing, a mandrel stem 10 has formed thereon a neck 11, providing a shoulder 12 preferably at the end of the mandrel stem. A specially formed chuck is provided having a head 14, and a mandrel stem lock, which in the instance illustrated comprises a plurality of jaw holders 15 containing jaws 16 for engaging the mandrel stem 10 at the shoulder 12.

In the form illsutrated, four jaws 16 are shown which are movable radially in the jaw holders 15, being slidable in slots provided for the purpose. A pin 17 is provided in each jaw holder 15 and extends axially of the chuck in a direction opposite to that in which the mandrel extends. Springs 16a carried in spring boxes 16b may be associated with each jaw 16 and may tend to force the jaws inwardly. On the head 14, there is provided means for moving the jaws into engaging position with the mandrel stem, this jaw actuating means being here shown as a rotatable disc 18. The disc 18 has formed in it four slots 19 symmetrically disposed about its center, and extending spirally therein. The head 14 and the disc 18 are mounted coaxially and in such relation that the pins 17, in the jaw holders 15, will extend through the slots 19.

If the pins 17 are fast in the jaw holders 15, the jaws will be closed or moved into engaging position when the disc 18 is rotated in a counter-clockwise direction, and will be opened or moved into a disengaging position when the disc is rotated in a clockwise direction. Furthermore, after the jaws have been moved into disengaging position and the mandrel stem has been released, the disc 18 may be turned back in a counter-clockwise direction thereby returning the jaws to engaging or locking position without the mandrel therein. Now, by being run back until its end contacts with the chuck the mandrel stem will automatically become attached to the chuck by the action of the jaws 16 in thrusting outward against the springs 16a until the neck 11 is engaged by the jaws.

It is, of course, desirable to turn the mandrel with the tube which is being rolled or expanded in order to ease the work of rolling. The mandrel stem and mandrel may accordingly be driven and thus turned with the tube as the rolling progresses. Thus the mandrel stem lock, comprising the jaw holders 15, jaws 16, and disc 18 in the form here illustrated, is driven by a special drive in order that the mandrel stem may be turned as described. To be more specific, the disc 18 is power driven from an elongated pinion wheel 20 which is operated, for instance, by a motor 21. The motor may, in practice, be any suitable means for transmitting power which may be controlled at a distance.

When the tube expanding operation is in progress, the mandrel stem is clamped in the chuck as illustrated in Figure 1. The jaws 16 hold the stem firmly, and the chuck is rotated with the mandrel stem. As viewed in Fig. 2, the mandrel stem is turning in a counter-clockwise direction. If the disc 18 remained stationary the turning of the mandrel stem would act upon the jaws 16 by friction and would turn the jaws and the head in a counter-clockwise direction, which, as will be realized, would open the jaws. Provision is, therefore, made for rotating the disc 18 with the mandrel.

When a tube is to be expanded it is slipped over the mandrel stem and the end of the mandrel stem is pushed into the chuck, the jaws being open and the pins 17 being at the outer ends of the spiral slots 19. When the shoulder 12, at the end of the mandrel stem has passed the jaws, the motor 21 is started, turning the elongated pinion wheel 20 clockwise as viewed in Fig. 2. The disc 18 is thus rotated in a counter-clockwise direction closing the jaws upon the neck 11 and restraining the mandrel stem from axial motion to the right as viewed in Figure 1. Alternatively the collar 12 may be snapped passed spring controlled jaws as already described.

As the expanding operation proceeds, and the mandrel stem is turned, friction between the jaws 16 and the mandrel stem will turn the head 14. This motion is in a counter-clockwise direction when the parts are viewed as in Fig. 2, and tends to open the jaws. The motor 21, however, continues its operation after the jaws have been closed, and rotates the disc 18 also in a counter-clockwise direction as viewed in Fig. 2, thus keeping the pins in the position in which they are shown in Fig. 2, and maintaining the jaws in closed position.

It will be realized that the driving motor 21 must be capable of operating at a variety of speeds, since at times it may be necessary for it to turn the disc 18 at a greater rate of speed than the rate at which the mandrel stem is rotated, at other times it will be necessary to turn the disc at a speed equal to that at which the mandrel stem is rotated, and at still other times, it will be necessary to stop or reverse the motor. The driving motor should, therefore, be a variable speed electric motor, a compressed air motor, an internal combustion motor, or a constant speed motor operating through a slip coupling.

If the mandrel stem is to be released during rolling, it is merely necessary to reduce the speed of the driving motor thus allowing rotation of the mandrel stem to turn the head 14 faster than the disc 18 is turned. Under these conditions the pins 17 will be moved outwardly along the spiral slots 19, thus opening the jaws. To release the mandrel stem when it is not being rotated, the driving motor is reversed. The disc is then turned in a clockwise direction affecting the same result as that which has just been indicated.

There is here shown and described by way of illustration but one form of the invention. Other forms, which do not depart from the proper scope of the present invention will readily suggest themselves to those skilled in the art.

I claim:

1. A chuck for holding a mandrel stem having a shoulder thereon, comprising a head a plurality of jaw holders, a plurality of jaws for engaging said mandrel stem at the shoulder mounted in said jaw holders and movable radially therein, pins in said jaw holders extending axially of the chuck, and a disc mounted coaxially with said head having spirally extending slots therein through which said pins extend, in combination with means including a motor for turning said disc to actuate said jaws.

2. A chuck for holding a mandrel stem having a shoulder thereon, comprising a head, a plurality of jaw holders a plurality of jaws for engaging said mandrel stem at the shoulder mounted in said jaw holders and movable radially therein, pins in said jaw holders extending axially of the chuck, and a disc mounted coaxially with said head, having spirally extending slots therein through which said pins extend, in combination with means including a variable speed electric motor for turning said disc to actuate said jaws, substantially as described.

3. A chuck for holding a mandrel stem having a shoulder thereon, comprising a head, jaw holders mounted on said head, jaws mounted in said holders and spring pressed radially inward, pins in said jaw holders, a disc having slots therein for said pins, means for rotating said disc to cause said jaws to grip or release said mandrel.

4. In a mill for expanding tubes, a chuck for holding a mandrel stem having a shoulder thereon, comprising a head, jaw holders mounted on said head, jaws mounted in said holders, springs urging said jaws inwardly, pins in said jaw holders, a slotted disc engaging with said pins to cause engagement and disengagement of said jaws with said stem, and means to rotate said chuck simultaneously with said stem during the rolling operation.

In testimony whereof I have signed my name to this specification.

KARL GRUBER.